(12) United States Patent
Adams

(10) Patent No.: US 8,446,525 B2
(45) Date of Patent: May 21, 2013

(54) EDGE DETECTION

(75) Inventor: Dale Richard Adams, Gualala, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 0 days.

(21) Appl. No.: 13/153,230

(22) Filed: Jun. 3, 2011

(65) Prior Publication Data

US 2011/0249179 A1 Oct. 13, 2011

Related U.S. Application Data

(62) Division of application No. 11/437,357, filed on May 19, 2006, now Pat. No. 7,982,798.

(60) Provisional application No. 60/715,711, filed on Sep. 8, 2005.

(51) Int. Cl.
*H04N 7/01* (2006.01)
*H04N 11/20* (2006.01)

(52) U.S. Cl.
USPC .......................................... 348/448; 348/452

(58) Field of Classification Search
USPC ................................................ 348/448, 452
See application file for complete search history.

(56) References Cited

U.S. PATENT DOCUMENTS

| | | | |
|---|---|---|---|
| 5,305,106 A | 4/1994 | Fukushima et al. | |
| 5,357,606 A | 10/1994 | Adams | |
| 5,436,668 A | 7/1995 | Tults | |
| 5,532,751 A | 7/1996 | Lui | |
| 5,550,592 A | 8/1996 | Markandey et al. | |
| 5,661,525 A * | 8/1997 | Kovacevic et al. | 348/452 |
| 5,689,301 A | 11/1997 | Christopher et al. | |
| 5,790,269 A | 8/1998 | Masaki et al. | |
| 5,796,875 A | 8/1998 | Read | |
| 5,828,786 A | 10/1998 | Rao et al. | |
| 5,852,475 A | 12/1998 | Gupta et al. | |
| 5,920,356 A | 7/1999 | Gupta et al. | |
| 5,943,099 A * | 8/1999 | Kim | 348/448 |
| 6,055,018 A | 4/2000 | Swan | |

(Continued)

FOREIGN PATENT DOCUMENTS

| EP | 0881837 | 12/1998 |
|---|---|---|
| EP | 1039760 | 9/2000 |

(Continued)

OTHER PUBLICATIONS

International Preliminary Report on Patentability in International Patent Application No. PCT/US2009/054427, dated Mar. 17, 2011, 5 pages.

(Continued)

*Primary Examiner* — Brian Yenke
(74) *Attorney, Agent, or Firm* — Blakely Sokoloff Taylor Zafman LLP

(57) ABSTRACT

A technique for deinterlacing an interlaced video stream is disclosed. A embodiment of a method includes calculating a pixel using edge detection, calculating a pixel using vertical interpolation, calculating a pixel using weaving, calculating a confidence level, calculating a motion value, blending the edge pixel calculation with the vertical interpolation calculation to generate a first output pixel calculation, the blending being based on the confidence level, and blending the first output pixel calculation with the weaving calculation to generate a second output pixel calculation, the blending being based on the motion value.

10 Claims, 9 Drawing Sheets

U.S. PATENT DOCUMENTS

| | | | |
|---|---|---|---|
| 6,064,776 A | 5/2000 | Kikuchi et al. | |
| 6,069,664 A | 5/2000 | Zhu et al. | |
| 6,167,164 A | 12/2000 | Lee et al. | |
| 6,181,382 B1* | 1/2001 | Kieu et al. | 348/459 |
| 6,285,801 B1 | 9/2001 | Mancuso et al. | |
| 6,380,978 B1 | 4/2002 | Adams et al. | |
| 6,421,090 B1 | 7/2002 | Jiang et al. | |
| 6,459,455 B1 | 10/2002 | Jiang et al. | |
| 6,489,998 B1 | 12/2002 | Thompson et al. | |
| 6,515,706 B1 | 2/2003 | Thompson et al. | |
| 6,525,774 B1 | 2/2003 | Sugihra | |
| 6,542,199 B1 | 4/2003 | Manbeck et al. | |
| 6,577,345 B1* | 6/2003 | Lim et al. | 348/452 |
| 6,587,158 B1 | 7/2003 | Adams et al. | |
| 6,621,937 B1 | 9/2003 | Adams et al. | |
| 6,681,059 B1 | 1/2004 | Thompson | |
| 6,700,622 B2 | 3/2004 | Adams et al. | |
| 6,757,022 B2 | 6/2004 | Wredenhagen et al. | |
| 6,757,442 B1 | 6/2004 | Avinash | |
| 6,859,237 B2 | 2/2005 | Swartz | |
| 6,867,814 B2 | 3/2005 | Adams et al. | |
| 6,870,562 B2 | 3/2005 | Johnson et al. | |
| 6,975,776 B2 | 12/2005 | Ferguson | |
| 6,999,047 B1 | 2/2006 | Holtslag | |
| 7,012,649 B2* | 3/2006 | Michel | 348/448 |
| 7,023,487 B1* | 4/2006 | Adams | 348/448 |
| 7,027,099 B2 | 4/2006 | Thompson et al. | |
| 7,126,643 B2 | 10/2006 | Song et al. | |
| 7,136,541 B2 | 11/2006 | Zhang et al. | |
| 7,154,555 B2 | 12/2006 | Conklin | |
| 7,154,556 B1 | 12/2006 | Wang et al. | |
| 7,167,977 B2 | 1/2007 | Morris | |
| 7,206,025 B2 | 4/2007 | Choi | |
| 7,236,209 B2 | 6/2007 | Martin | |
| 7,257,272 B2 | 8/2007 | Blake et al. | |
| 7,265,791 B2* | 9/2007 | Song et al. | 348/448 |
| 7,321,396 B2* | 1/2008 | Jung et al. | 348/452 |
| 7,345,708 B2 | 3/2008 | Winger et al. | |
| 7,349,028 B2 | 3/2008 | Neuman et al. | |
| 7,349,029 B1 | 3/2008 | Chou et al. | |
| 7,362,376 B2 | 4/2008 | Winger et al. | |
| 7,379,626 B2* | 5/2008 | Lachine et al. | 382/300 |
| 7,391,468 B2 | 6/2008 | Shah | |
| 7,400,359 B1 | 7/2008 | Adams | |
| 7,412,096 B2 | 8/2008 | Neuman et al. | |
| 7,414,671 B1 | 8/2008 | Gallagher et al. | |
| 7,417,686 B2 | 8/2008 | Zhu | |
| 7,423,691 B2* | 9/2008 | Orlick et al. | 348/448 |
| 7,474,354 B2 | 1/2009 | Kawamura et al. | |
| 7,515,205 B1 | 4/2009 | Wang et al. | |
| 7,529,426 B2 | 5/2009 | Neuman | |
| 7,551,800 B2 | 6/2009 | Corcoran et al. | |
| 7,554,602 B2 | 6/2009 | Liao et al. | |
| 7,557,861 B2 | 7/2009 | Wyman | |
| 7,605,866 B2 | 10/2009 | Conklin | |
| 7,657,098 B2 | 2/2010 | Lin et al. | |
| 7,659,939 B2 | 2/2010 | Winger et al. | |
| 7,667,773 B2 | 2/2010 | Han | |
| 7,710,501 B1 | 5/2010 | Adams et al. | |
| 7,787,048 B1* | 8/2010 | Vojkovich et al. | 348/452 |
| 7,796,191 B1* | 9/2010 | Vojkovich | 348/448 |
| 7,865,035 B2 | 1/2011 | Lin et al. | |
| 7,940,992 B2 | 5/2011 | Johnson et al. | |
| 7,969,511 B2 | 6/2011 | Kim | |
| 7,982,798 B2 | 7/2011 | Adams | |
| 7,986,854 B2 | 7/2011 | Kim et al. | |
| 7,990,471 B1* | 8/2011 | Otobe et al. | 348/448 |
| 8,004,606 B2 | 8/2011 | Dale | |
| 8,086,067 B2 | 12/2011 | Thompson | |
| 8,120,703 B2 | 2/2012 | Dale | |
| 2002/0149685 A1 | 10/2002 | Kobayashi et al. | |
| 2003/0095205 A1* | 5/2003 | Orlick et al. | 348/448 |
| 2003/0103680 A1 | 6/2003 | Westerman | |
| 2003/0156301 A1 | 8/2003 | Kempf et al. | |
| 2004/0042673 A1 | 3/2004 | Boon | |
| 2004/0189877 A1 | 9/2004 | Choi et al. | |
| 2004/0207753 A1* | 10/2004 | Jung | 348/452 |
| 2005/0046741 A1 | 3/2005 | Wu | |
| 2005/0122433 A1 | 6/2005 | Satou et al. | |
| 2005/0128360 A1 | 6/2005 | Lu | |
| 2005/0129306 A1 | 6/2005 | Wang et al. | |
| 2005/0201626 A1* | 9/2005 | Kang et al. | 382/236 |
| 2005/0243204 A1 | 11/2005 | Zhu | |
| 2006/0002624 A1 | 1/2006 | Tamura | |
| 2006/0072037 A1 | 4/2006 | Wyman | |
| 2006/0133772 A1 | 6/2006 | Nakajima | |
| 2007/0052845 A1 | 3/2007 | Adams | |
| 2007/0103587 A1* | 5/2007 | MacInnis et al. | 348/448 |
| 2007/0103588 A1 | 5/2007 | MacInnis et al. | |
| 2007/0223835 A1 | 9/2007 | Yamada et al. | |
| 2008/0117330 A1* | 5/2008 | Winger et al. | 348/448 |
| 2008/0123998 A1 | 5/2008 | Gomi et al. | |
| 2008/0143873 A1 | 6/2008 | Neuman | |
| 2008/0151103 A1* | 6/2008 | Asamura et al. | 348/448 |
| 2008/0152253 A1 | 6/2008 | Thompson | |
| 2009/0196500 A1 | 8/2009 | Shi et al. | |
| 2009/0262247 A1 | 10/2009 | Huang et al. | |
| 2010/0054622 A1 | 3/2010 | Adams | |
| 2010/0157147 A1* | 6/2010 | Bellers | 348/448 |
| 2010/0202262 A1 | 8/2010 | Adams et al. | |

FOREIGN PATENT DOCUMENTS

| | | |
|---|---|---|
| EP | 1434438 | 6/2004 |
| EP | 1492344 | 12/2004 |
| JP | 2001-245155 | 9/2001 |
| JP | 2005-122361 | 5/2005 |
| JP | 2007-213125 | 8/2007 |

OTHER PUBLICATIONS

Notice of Allowance for U.S. Appl. No. 11/941,050, mailed Aug. 18, 2011, 10 pages.

International Preliminary Report on Patentability for International Patent Application No. PCT/US2007/084881, mailed Jul. 2, 2009.

International Preliminary Report on Patentability for International Patent Application No. PCT/US2006/034785, mailed Mar. 20, 2008.

Final Office Action for U.S. Appl. No. 11/941,050, mailed Jul. 13, 2011, 16 pages.

Office Action mailed Feb. 22, 2012, in U.S. Appl No. 12/204,760, 12 pages.

International Preliminary Report on Patentability for International Patent Application No. PCT/US2010/023775, Mailed Aug. 25, 2011, 6 pages.

Adams, D., U.S. Appl. No. 10/753,909, entitled, "Video Stream Routing & Format Conversion Unite With Audio Delay", filed Jan. 7, 2004, background pp. 2-9.

Analog Devices CMOS 180 MHz DDS/DAC Synthesizer, AD9851, Rev. C, Analog Devices, Inc., www.analog.com, 24 pages (1999).

Communication pursuant to Article 94(3) EPC dated Feb. 10, 2011, in European Patent Application No. 06 814 256.1, 4 pages.

Final Office Action mailed Apr. 19, 2010, in U.S. Appl. No. 11/487,144, filed Jul. 13, 2006.

International Preliminary Report on Patentability dated Mar. 8, 2011, in International Patent Application No. PCT/US2009/054427, 5 pages.

Non-Final Office Action mailed Aug. 20, 2010 in U.S. Appl. No. 11/487,144.

Non-Final Office Action mailed Dec. 13, 2010, in U.S. Appl. No. 11/512,754.

Non-Final Office Action mailed Dec. 31, 2009, in U.S. Appl. No. 11/487,144.

Non-Final Office Action mailed Feb. 1, 2011, in U.S. Appl. No. 11/941,050.

Non-Final Office Action mailed Jun. 25, 2010, in U.S. Appl. No. 11/512,754.

Non-Final Office Action mailed Mar. 18, 2008, in U.S. Appl. No. 10/753,909.

Non-Final Office Action mailed May 11, 2011, in U.S. Appl. No. 11/512,754.

Non-Final Office Action mailed Sep. 11, 2009 in U.S. Appl. No. 10/889,855.

Non-Final Office Action mailed Sep. 23, 2010 in U.S. Appl. No. 11/437,357.
Notice of Preliminary Rejection dated Aug. 23, 2012 (+ English translation), in Korean Patent Application No. 10-2008-7005491, 6 pages.
Office Action mailed Aug. 18, 2010, in Canadian Patent Application No. 2,620,820.

Office Action mailed Jul. 16, 2010, in European Patent Application No. 06814256.1.
Supplementary European Search Report and Opinion dated Mar. 31, 2010, in European Patent Application No. 06814256.1, 7 pages.

* cited by examiner

EDGE DETECTION

CROSS-REFERENCE TO RELATED APPLICATIONS

This application is a divisional of U.S. application Ser. No. 11/437,357 entitled "Edge Detection" filed on May 19, 2006 which claims the benefit of U.S. Provisional Application No. 60/715,711 entitled "Source-Adaptive Video Deinterlacer" filed on Sep. 8, 2005, both of which are herein incorporated by reference.

BACKGROUND

Deinterlacing is an art that involves converting interlaced video fields into non-interlaced video frames. Deinterlacing is required because most modern televisions are inherently progressive and the video feed is broadcasted in interlaced form.

There are three common techniques to deinterlace an interlaced video feed. One of these techniques is known as vertical interpolation. Vertical interpolation involves averaging at least two scan lines to generate a new scan line. The technique is repeated for all scan lines and creates a full frame from a single video field. While vertical interpolation allows a progressive picture to be generated from one video field, half of the resolution of the video feed is lost.

Another deinterlacing technique is "weaving." Weaving involves merging a video field containing odd scan lines with a subsequent field containing even scan lines. The two fields are combined to generate a single progressive frame. Weaving is beneficial because it preserves the full resolution of the video feed. However, if motion is present, weaving results in motion artifacts because the two fields are not temporally aligned.

A third technique is known as motion adaptive deinterlacing. Motion adaptive is a combination of the vertical interpolation technique and the weaving technique. Motion-adaptive techniques make a pixel-by-pixel determination as to whether motion is present in the local area of the pixel. If motion is detected, then vertical interpolation is used. If no motion is detected, the weaving technique is used. However, when new pixels are calculated from a single field, jagged edges on objects result. Often, the jagged edges are caused by aliasing in the single field since using only every other line does not provide a vertical sampling frequency that is high enough to meet the Nyquist rate. Hence, aliases are present in the single field which are caused by the low vertical sampling rate. These aliases result in unnatural looking, jagged object edges.

In order to reduce the aliasing artifacts, edge detection is used. Edge detection involves detecting the edge location in the image and calculating new pixel values based on known pixels aligned along the edge direction. Using the known pixel values along the detected edge to calculate the new pixel values reduces or eliminates the aliasing artifacts.

The foregoing examples of the related art and limitations related therewith are intended to be illustrative and not exclusive. Other limitations of the related art will become apparent to those of skill in the art upon a reading of the specification and a study of the drawings.

SUMMARY OF THE INVENTION

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A technique for deinterlacing an interlaced video stream involves detecting an edge and calculating an unknown pixel using known pixels along the edge. An example of a method according to the technique involves calculating a gradient of image intensity for a 2-dimensional image. An edge can be identified using the gradient calculations. An angle of the edge can also be identified using the gradient calculations. Once the edge and angle are unknown, a bin can be selected that encompasses the edge angle. The bin boundaries can be boundaries with directions that are aligned on known pixel locations. The bin boundaries can allow for the calculation of new pixel values aligned on the boundaries. The unknown pixel can be calculated as a blend of the calculated pixels which are aligned on the bin boundaries. Additionally, the distance from one of the bin boundaries to the edge angle can be calculated and the blending can be further based on the calculated distance.

In additional embodiments, vertical interpolation can be performed before calculating the gradient. Performing a vertical interpolation allows a gradient value to be calculated directly for each pixel location for which a new pixel value must be calculated. In additional embodiments, the vertically interpolated frame can be subjected to a lowpass filter prior to the gradient calculation to smooth the image. The lowpass filter can reduce the high frequencies that can reduce the reliability of the gradient calculations. The gradient calculations can include a horizontal gradient calculation and a vertical gradient calculation. The edge location can be identified using a gradient magnitude. The edge angle can be identified using an inverse-tangent of the horizontal and vertical gradient.

In certain embodiments, the detected edge can be verified using a dynamic range. The dynamic range can be determined by a minimum pixel value and a maximum pixel value. Further, noise can be removed using a median filter. In addition, the boundaries of the bin can be determined by an angle location of known pixel data.

In other embodiments, the pixel calculation can be validated using a confidence level indicator. The confidence level indicator can be determined by counting a number of angles present in the immediate area of the pixel, counting a number of angles that are similar to the detected edge, counting a number of angles that are different that the detected edge, counting a number of pixels with similar directions as the detected edge and counting a number of pixels with different directions as the detected edge. The results can be combined to generate a confidence level.

Another example of a method according to the technique involves calculating a pixel using edge detection. A pixel can also be calculated using vertical interpolation and weaving. A confidence level and motion value can be further calculated. The edge pixel calculation can be blended with the vertical interpolation calculation to generate a first output pixel calculation. The blending can be based on the confidence level. The first output pixel calculation can be blended with the weaving calculation to generate a second output pixel calculation. The blending can be based on the motion value.

In another embodiment, the technique involves determining whether a cadence has been identified. If a cadence has been identified, a result based on the cadence can be provided. If a cadence has not been identified, a result based on the second output pixel calculation can be provided.

An example of a system according to the technique includes a motion module, a weave calculation module, an edge direction module, a confidence level module, an edge pixel calculation module, a blend edge/vertical interpolation module, and a blend weave/edge/vertical interpolation module. The confidence level module can be coupled to the edge direction module and the edge pixel calculation module. The edge pixel calculation module can be further coupled to the edge direction module. The blend/edge vertical interpolation module can be coupled to the edge pixel calculation module, the vertical interpolation module and the confidence level module. The blend weave/edge/vertical interpolation module can be coupled to the motion module, the weave calculation module and the blend edge/vertical interpolation module. The system can provide a deinterlaced picture as an output.

In another embodiment, the system can further comprise a cadence detection module and an optimization module. The optimization module can be coupled to the cadence detection module and the blend weave/edge/vertical interpolation module. The output of the system can be an optimal deinterlaced picture.

The proposed method, system and device can offer, among other advantages, a deinterlaced picture. This can be accomplished in an efficient and robust manner compared to other deinterlacing techniques. Advantageously, the proposed system, method and device can deinterlace an interlaced video stream with high precision by detecting edges within the image. An unknown pixel is mapped to a bin that contains the detected edge angle and known pixel values from the bin boundaries are blended to calculate the unknown pixel. The technique produces a high quality deinterlaced picture from an interlaced video source because known pixels that are closest to the detected edge are used to calculate the unknown pixels. These and other advantages of the present invention will become apparent to those skilled in the art upon a reading of the following descriptions and a study of the several figures of the drawings.

BRIEF DESCRIPTION OF THE DRAWINGS

Embodiments of the inventions are illustrated in the figures. However, the embodiments and figures are illustrative rather than limiting; they provide examples of the invention.

DETAILED DESCRIPTION OF THE DRAWINGS

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments, of the invention.

Figure 1:
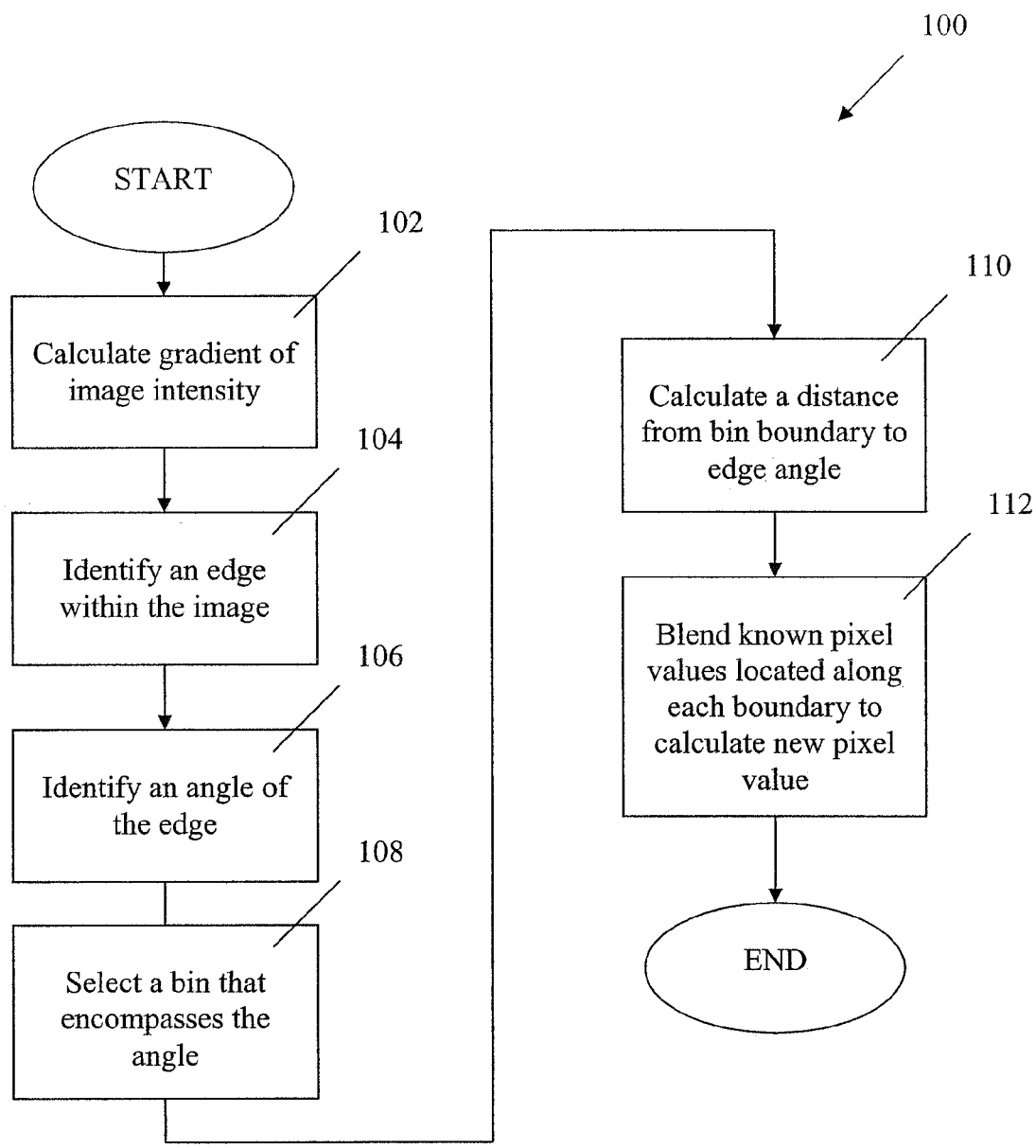
FIG. 1 depicts a flowchart of an example of a method for calculating an unknown pixel using edge detection.

FIG. 1 depicts a flowchart 100 of an example of a method for calculating an unknown pixel using edge detection. FIG. 1 is intended to illustrate blending known pixel values along bin boundaries to calculate a new pixel value. In the example of FIG. 1, the flowchart 100 starts at module 102 where a gradient of image intensity is calculated. A number of gradients can be calculated in order to facilitate edge detection including, but not limited to, a horizontal gradient, vertical gradient, diagonal gradient, or the like.

In the example of FIG. 1, the flowchart 100 continues at module 104 where an edge is identified within the image. Once the gradient is calculated, the edge can be identified using any known and/or convenient operator and/or technique, including but not limited to a Canny edge detector or modification thereof, Sobel technique or modification thereof and/or any other technique involving a high-pass frequency filter, low pass frequency filter, bandpass filter, difference of Gaussians, FIR filter, convolution, first order differential operators and/or second order differential operators.

In the example of FIG. 1, the flow chart 100 continues at module 106 where an angle of the edge is identified. The angle of the detected edge can be calculated by taking the arctan of the results of the gradient operators. For example, and not limitation, after a Sobel operator performs a 2-D spatial gradient measurement on an image, the angle can be calculated by taking the arctan of the horizontal gradient component and the vertical gradient component. In other embodiments, the angle can be calculated using any known and/or convenient trigonometric technique depending on the calculations used to detect the edge.

In the example of FIG. 1, the flowchart 100 continues at module 108 where a bin that encompasses the edge angle is selected. The bin can be an angle location of known pixel data. The bins can be formed by boundaries, namely a high boundary and a low boundary. Because the boundaries of the bins are formed by known pixel data, the bins can be preset. The detected edge can be mapped to the bin with the boundaries that encompass the detected edge angle.

In the example of FIG. 1, the flowchart 100 continues at module 110 where a distance from a bin boundary to the edge angle is calculated. In one embodiment, the bin boundaries can be assigned as the tangent of an angle through known pixel locations. The tangent of an angle of the detected edge, which can be the ratio of the horizontal and vertical gradient values, can be directly compared to the bin boundaries to determine the distance from one or both of the bin boundaries. Since the bin boundaries and the ratio of horizontal and vertical gradients have the same units, i.e. tangent of angles, the distance from a bin boundary to the detected edge can be calculated efficiently. In another embodiment, a set of edges at certain angles through known pixel locations can be run through the gradient edge detector and the resulting values can be used as the bin boundaries. The boundaries of the bin can be represented by a value for two different known pixel locations. The bin boundaries can be the tangent-of-angle values and the ratio of the horizontal and vertical gradients can produce a tangent-of-angle value. Using this information, the location of the direction of the edge for each unknown pixel location within a bin can be determined. In one embodiment, the distance from one bin boundary to the next can be broken into 16 divisions, and the tangent of the edge-angle of the unknown pixel can be assigned to the closest division.

In the example of FIG. 1, the flowchart 100 continues at module 112 where known pixel values located along each boundary are blended to calculate a new pixel value. The blending can be based on the calculated distance from the unknown pixel to one and/or both of the bin boundaries. The blending can be facilitated using any known and/or convenient technique, including, but not limited to multiplying the known pixels by a ratio formula and combining the results.

In one embodiment, a first ratio formula can be calculated by dividing the distance of the unknown pixel to a known pixel along the high boundary by the total distance between known pixels. A second ratio formula can be calculated by dividing the distance of the unknown pixel data to a known pixel along the low boundary by the total distance between the known pixels. The first and second ratio formulas can be multiplied by their respective known pixels and the results combined to generate a new pixel value. In other embodiments, a first ratio formula can be calculated and subtracted from one to obtain a second ratio formula.

Figure 2:
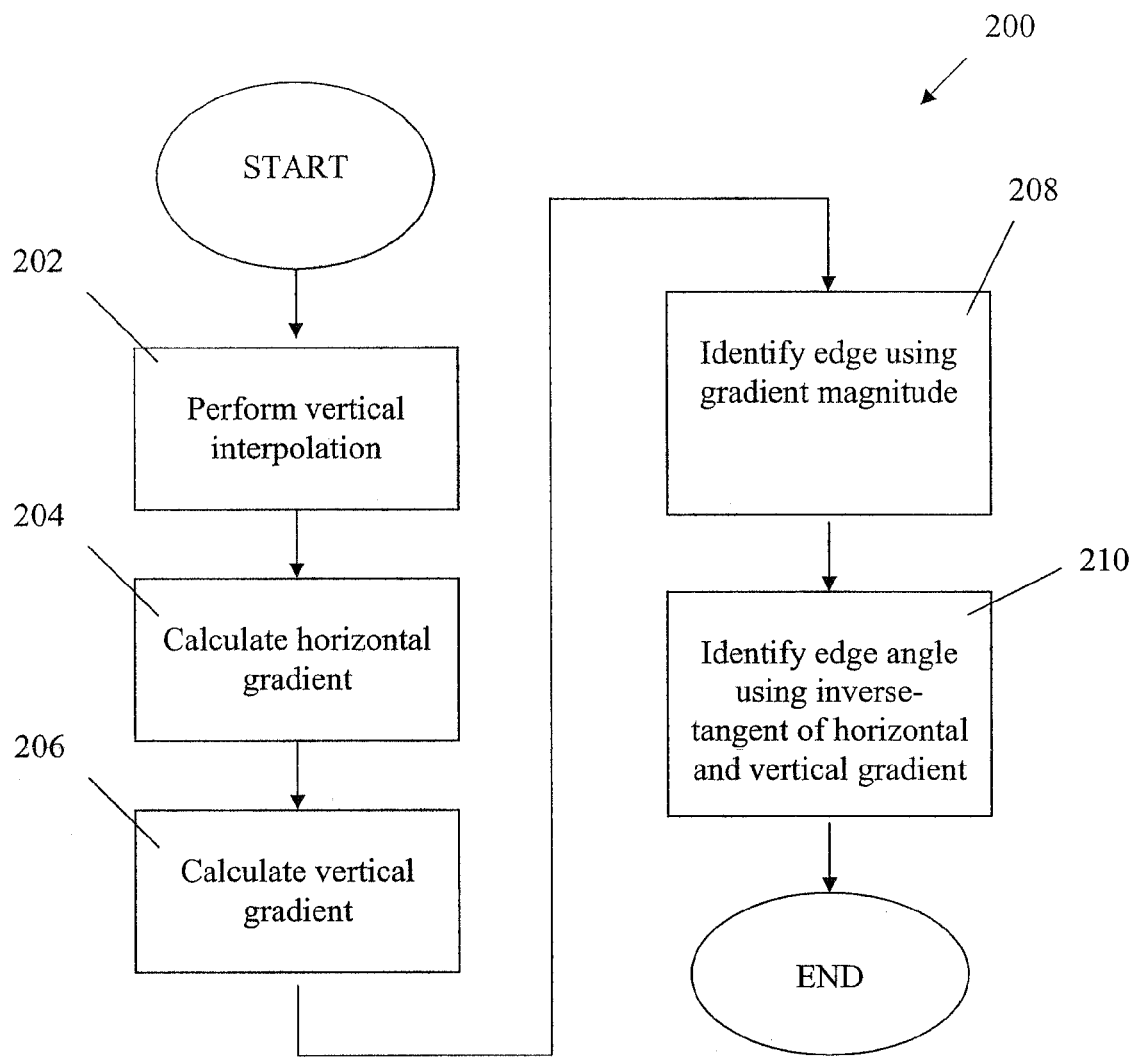
FIG. 2 depicts a flowchart of an example of a method for detecting an edge in a 2-dimensional image.

FIG. 2 depicts a flowchart 200 of an example of a method for detecting an edge in a 2-dimensional image. FIG. 2 is intended to illustrate identifying an edge using gradient calculations. In the example of FIG. 2, the flowchart 200 starts at module 202 where vertical interpolation is performed. In one embodiment, known pixel values above and below an unknown pixel value are averaged to generate a new pixel value. In other embodiments, either the known pixel value above or the known pixel value below is used as the new pixel value. In another embodiment, adjacent known pixel values can be averaged to generate the new pixel value and/or an adjacent value can be used as the new pixel value.

In the example of FIG. 2, the flowchart 200 continues at module 204 where a horizontal gradient is calculated. The horizontal gradient can be calculated using any convenient and/or known technique. For example, but not limitation, the horizontal gradient can be calculated by taking the difference between column values. In other embodiments, the horizontal gradient can be provided manually and/or automatically as the result of a system function.

In the example of FIG. 2, the flowchart 200 continues at module 206 where a vertical gradient is calculated. The vertical gradient can be calculated using any convenient and/or known technique. For example, but not limitation, the vertical gradient can be calculated by taking the difference between row values. In other embodiments, the vertical gradient can be provided manually and/or automatically as the result of a system function.

In the example of FIG. 2, the flowchart 200 continues at module 208 where an edge is identified using a gradient magnitude. The gradient magnitude calculation can be facilitated in any convenient and/or known manner, including but not limited to taking the root-square-mean of the horizontal gradient and the vertical gradient. In other embodiments, the magnitude of the gradient can be measured using a manual and/or automatic technique.

In the example of FIG. 2, the flowchart 200 continues at module 210 where an edge angle is identified using an inverse tangent of the horizontal and vertical gradient. In other embodiments, the edge angle can be identified using any convenient and/or known technique including, but not limited to, another trigonometric function and/or a manual and/or automatic input as the result of a system function.

Figure 3:
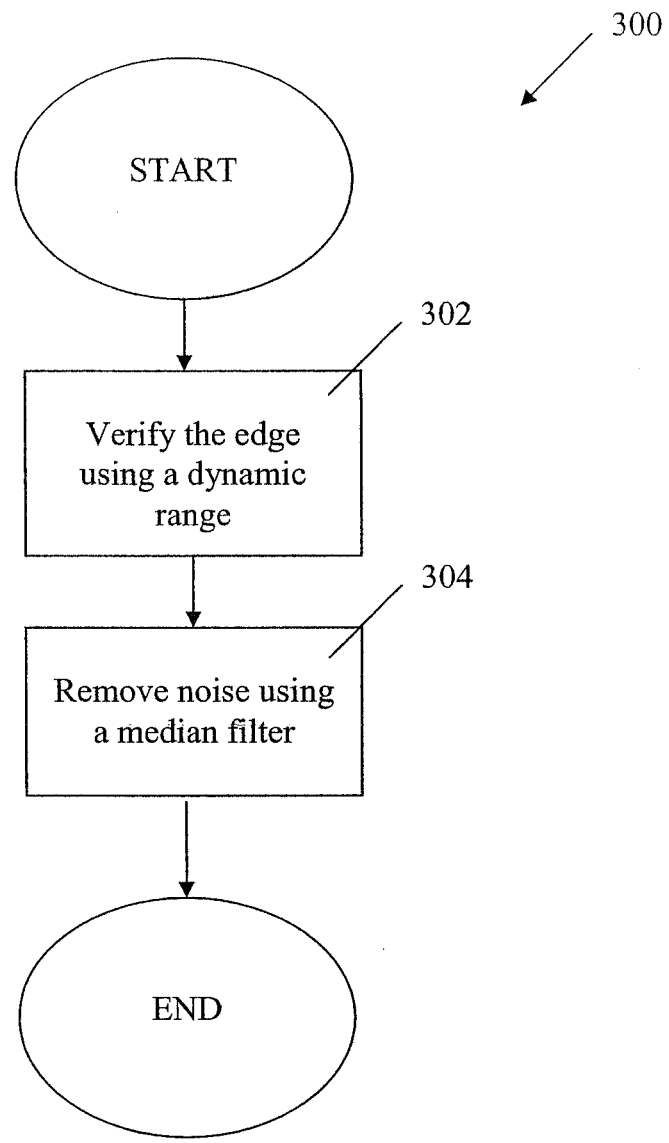
FIG. 3 depicts a flowchart of an example of a method for verifying an edge and removing noise.

FIG. 3 depicts a flowchart 300 of an example of a method for verifying an edge and removing noise. FIG. 3 is intended to illustrate steps that can be used to ensure accurate results from the edge detection. In the example of FIG. 3, the flowchart 300 starts at module 302 where an edge is verified using a dynamic range. In one embodiment, the edge magnitude can be compared to a threshold to determine validity. The threshold can be dynamic and vary with the dynamic range in the local area. For example, and not limitation, the dynamic range can be determined by finding a maximum pixel value and a minimum pixel value within the local area. In this embodiment, as the dynamic range varies, the threshold that is used to validate the edge magnitude also changes accordingly. In other embodiments, the dynamic range can be facilitated using any convenient and/or known technique including, by way of example and not limitation, numerical ratio, contrast ratio, gray level, gradation detection, density difference, bit measurement, radiant energy, intensity level, and/or image accuracy.

In the example of FIG. 3, the flowchart 300 continues at module 304 where noise is removed using a median filter. The median filter can remove noise which often leads to incorrect edge detections. In one embodiment, the median filter can be taken over a rectangular area around the unknown pixel location. For example, and not limitation, the median filter can be applied to the sign of the 2-dimensional gradient of each pixel location within a 3×3 array used for a Sobel-like gradient detection. By applying the median filter and taking the sign of the median bit, any noise that may have caused the direction and/or angle to be incorrect is eliminated. In other embodiments, the median filter can be facilitated using any known and/or convenient non-linear digital filtering technique capable of removing noise from an image. In additional embodiments, a linear digital filtering technique can be used, such as, for example, a mean filter.

Figure 4:
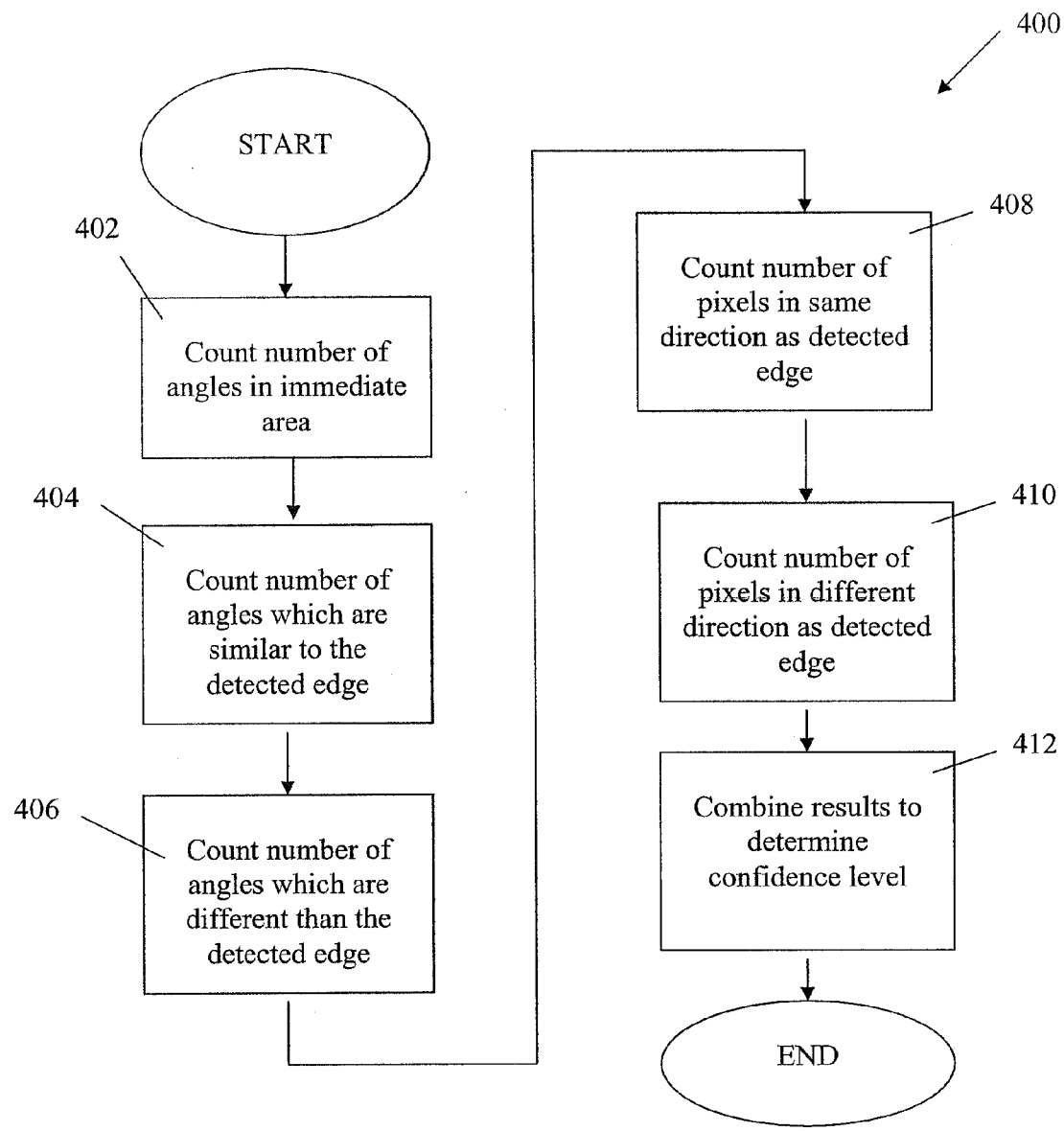
FIG. 4 depicts a flowchart of an example of a method for calculating a confidence level.

FIG. 4 depicts a flowchart 400 of an example of a method for calculating a confidence level. FIG. 4 is intended to illustrate the computation of a confidence level to ensure the appropriateness and correctness of an edge-detection based pixel calculation. In the example of FIG. 4, the flowchart 400 starts at module 402 where all of angles in the immediate area are counted. The number of angles can be counted using any known and/or convenient technique, including maintaining a counter of angles of known pixels.

In the example of FIG. 4, the flowchart 400 continues at module 404 where a number of angles which are similar to the detected edge are counted. The flowchart 400 continues further at module 406 where a number of angles which are different that the detected edge are counted. The counting of similar and different angles can be facilitated using any known and/or convenient technique capable of comparing the angles of known pixels and the angles of the detected edge.

In the example of FIG. 4, the flowchart 400 continues at module 408 where a number of pixels which are in the same direction as the detected edge are counted. The flowchart 400 further continues at module 410 where a number of pixels in a different direction as the detected edge are counted. The counting of similar and different angles can be facilitated using any known and/or convenient technique capable of comparing the directions of known pixels to the directions of the detected edge.

In the example of FIG. 4, the flowchart 400 continues at module 412 where the results are combined to determine a confidence level. For example, and not limitation, if a substantial number of angles in the immediate area are different from the detected edge, then the confidence level is low. However, if a substantial number of angles in the immediate area are similar, then the detected edge has a higher chance of being accurate and the confidence level is high. For example, and not limitation, if the detected edge has an angle of 30 degrees and all of the known angles in the immediate area are 150 degrees, then the confidence level is low because the angles are different. However, if the known angles in the immediate area are approximately 30 degrees, then the confidence level is high because the angles are similar. Likewise, if a substantial number of pixels are in a different direction from the detected edge, then the confidence level is low. If a substantial number of pixels are in a similar direction as the detected edge, then the confidence level is high. The results of the counting of the angles and the pixels can be combined to generate a more precise confidence level.

Figure 5:
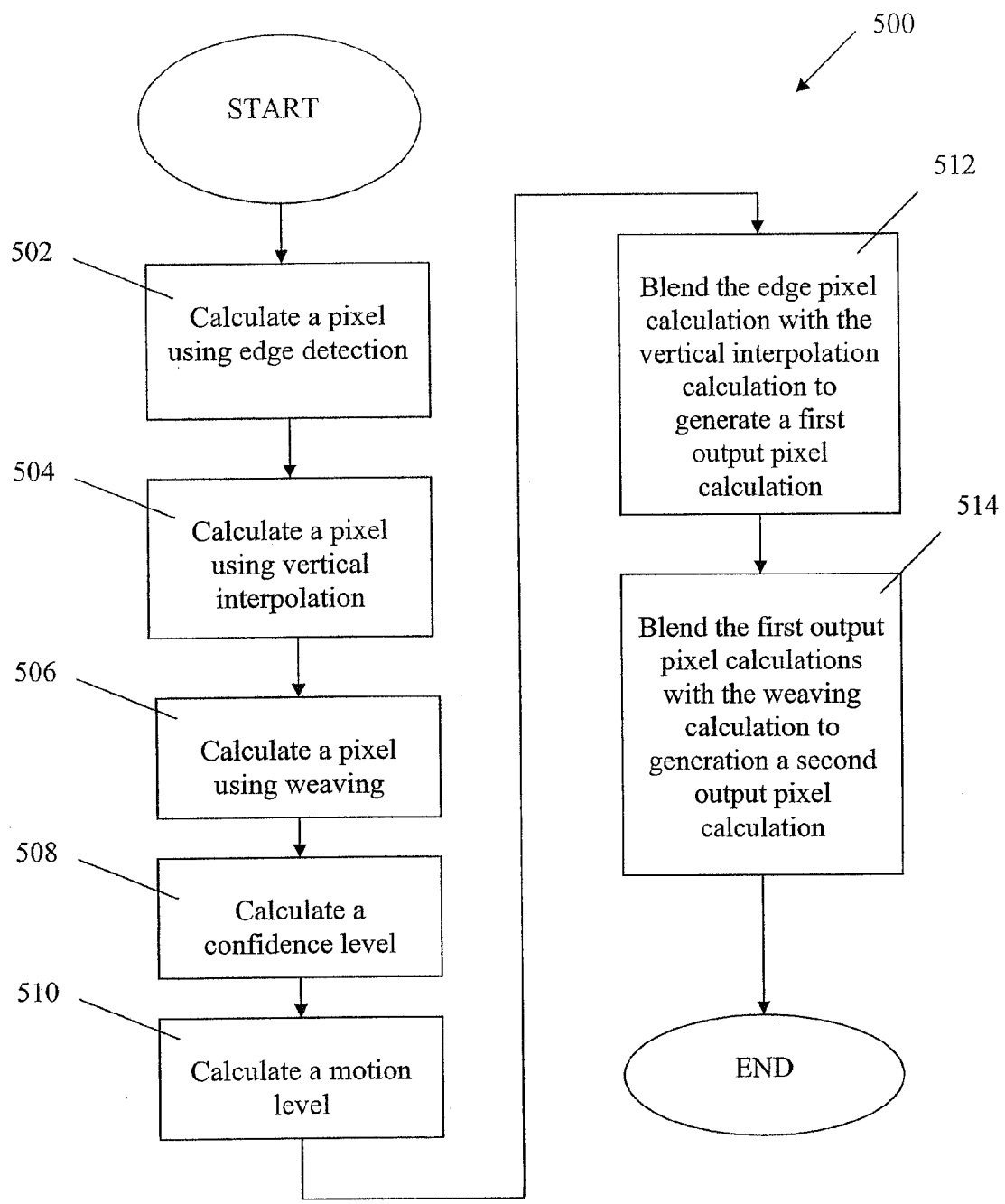
FIG. 5 depicts a flowchart of an example of a method for generating a deinterlaced picture.

FIG. 5 depicts a flowchart 500 of an example of a method for generating a deinterlaced picture. FIG. 5 is intended to illustrate a mechanism for generating an optimal deinterlaced picture. In the example of FIG. 5, the flowchart 500 starts at module 502 where a pixel is calculated using edge detection. The pixel can be calculated using any convenient and/or known technique, including, but not limited to, calculating a gradient of image intensity to determine valid edge locations and which bin encompasses the edge angle. In another embodiment, the edge can be detected and points along the edge can be combined to generate a new pixel. In other embodiments, the technique to calculate the pixel can be manual and/or automatic depending on the functionality of the system.

In the example of FIG. 5, the flowchart 500 continues at module 504 where a pixel is calculated using vertical interpolation. Calculating a pixel involves generating a value for an unknown pixel. The pixel can be calculated using any convenient and/or known interpolation technique. In one embodiment, the pixel can be calculated by averaging a value of a known pixel above and a value of a known pixel below the unknown pixel. In another embodiment, the value of a known pixel above and/or below the unknown pixel can equal a value of the unknown pixel. In other embodiments, an FIR filter, vertical-temporal filter, median filter, and/or 2-dimensional filters can be utilized to calculate the value of the unknown pixel.

In the example of FIG. 5, the flowchart 500 continues at module 506 where a pixel is calculated using weaving. In one embodiment, a first field containing odd scan lines as a result of an interlaced technique and a second field containing even scan lines as a result of an interlaced technique are combined. In another embodiment, the fields can be combined to calculate the pixel using a manual and/or automatic measurement as a result of a system function.

In the example of FIG. 5, the flowchart 500 continues at module 508 where a confidence level is calculated. The confidence level can measure the confidence of the results from the edge detection. The confidence level can be calculated using any known and/or convenient technique. For example, and not limitation, the confidence level can be determined by counting a number of bins, pixels, angles and/or any other data that is capable of comparison being similar and/or different from the calculated pixel.

In the example of FIG. 5, the flowchart 500 continues at module 510 where a motion level is calculated. The motion level can be calculated using any known and/or convenient technique. For example, and not limitation, motion can be calculated using residuals, bit-streams, I-frames, P-frames, B-frames, among others.

In the example of FIG. 5, the flowchart 500 continues at module 512 where the edge pixel calculation is blended with the vertical interpolation calculation to generate a first output pixel calculation. The blend can be based on the confidence level calculated in module 508. For example, if the confidence level of the edge detection is low, the vertical interpolation value would, in some embodiments, be given more weight than the edge detection calculation. Thus, the first output calculation would be based primarily on the vertical interpolation calculation. If the confidence level is high, then the edge detection calculation would be given more weight. Thus, the first output calculation would be based primarily on the edge detection calculation.

In the example of FIG. 5, the flowchart 500 continues at module 514 where the first output pixel calculation is blended with the weaving calculation to generate a second output pixel calculation. The blend can be based on the motion level calculated in module 510. For example, if the motion level is high, then the first output pixel calculation would be given more weight than the weaving calculation. Thus, the second output pixel calculation would be based primarily on the first output pixel calculation. If the motion level is low, then the weaved calculation would be given more weight than the first output calculation. Thus, the second output pixel calculation would be based primarily on the weaved calculation.

Figure 6:
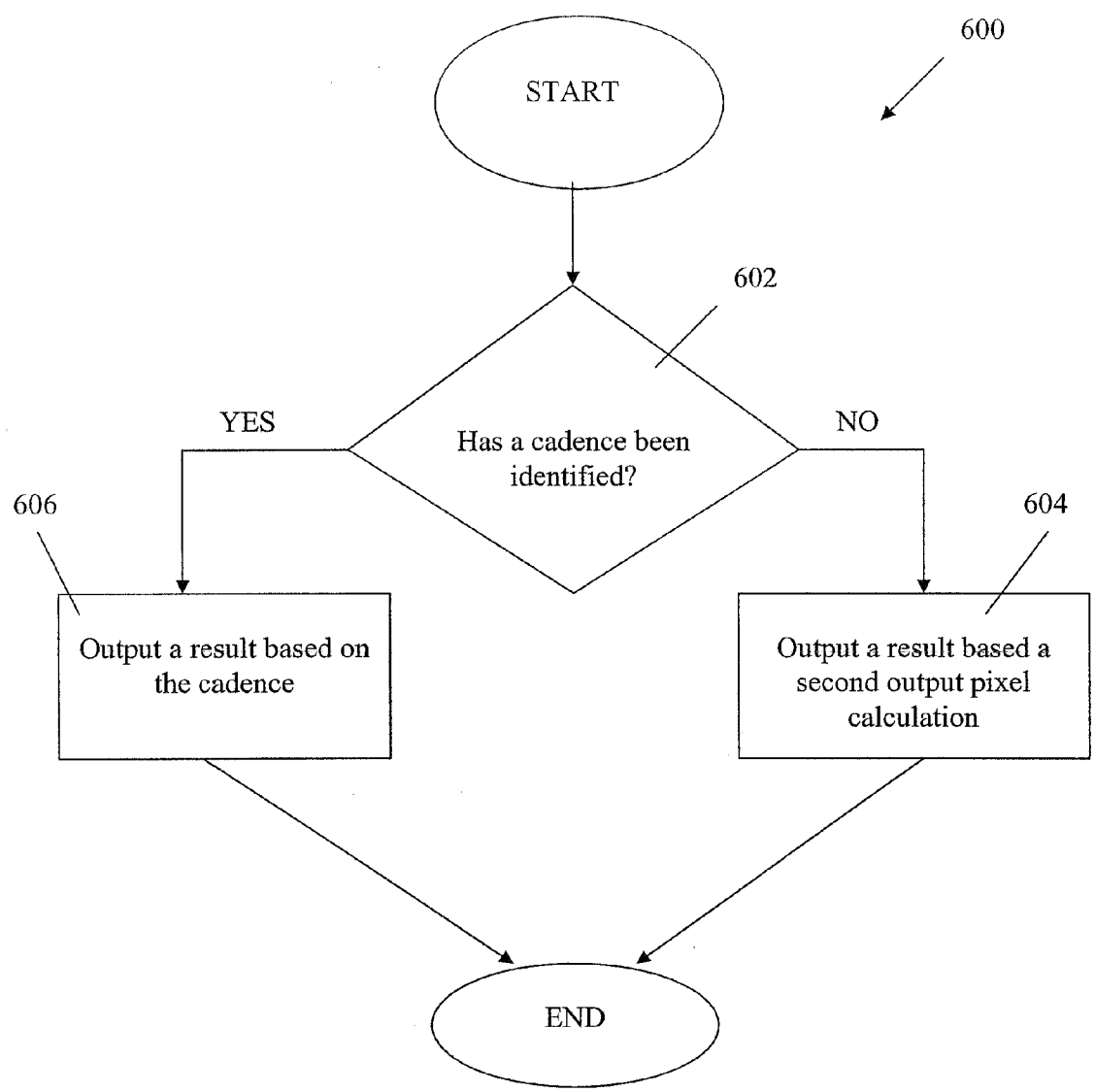
FIG. 6 depicts a flowchart of an example of a method for generating a deinterlaced picture.

FIG. 6 depicts a flowchart 600 of an example of a method for generating a deinterlaced picture. FIG. 6 is intended to illustrate a mechanism for generating an optimal deinterlaced picture. In the example of FIG. 6, the flowchart 600 starts at decision point 602 where it is determined whether a cadence has been identified. In one embodiment, a cadence can be a repetitive pattern of multiple adjacent fields taken from the same original image frame. For example, and not limitation, a standard telecine process, also known as 3:2 pulldown, used for converting 24 frame/second film sources to 60 Hz interlaced video can be a cadence.

If a cadence has not been identified (602—No), then at module 604, a result is provided that is based on a second output calculation. If a cadence has been identified (602—Yes), then at module 606 a result is provided that is based on the cadence. The cadence can be identified using any known and/or convenient technique, including, by way of example, the techniques provided in U.S. Provisional Patent Application No. 60/715,711 entitled "Source-Adaptive Video Deinterlacer" filed on Sep. 8, 2005 which is incorporated herein by reference. In certain embodiments, the determination of whether a cadence has been identified is performed on a frame by frame basis. However, in other embodiments, it can be possible to identify the cadence on a pixel by pixel basis.

Figure 7:
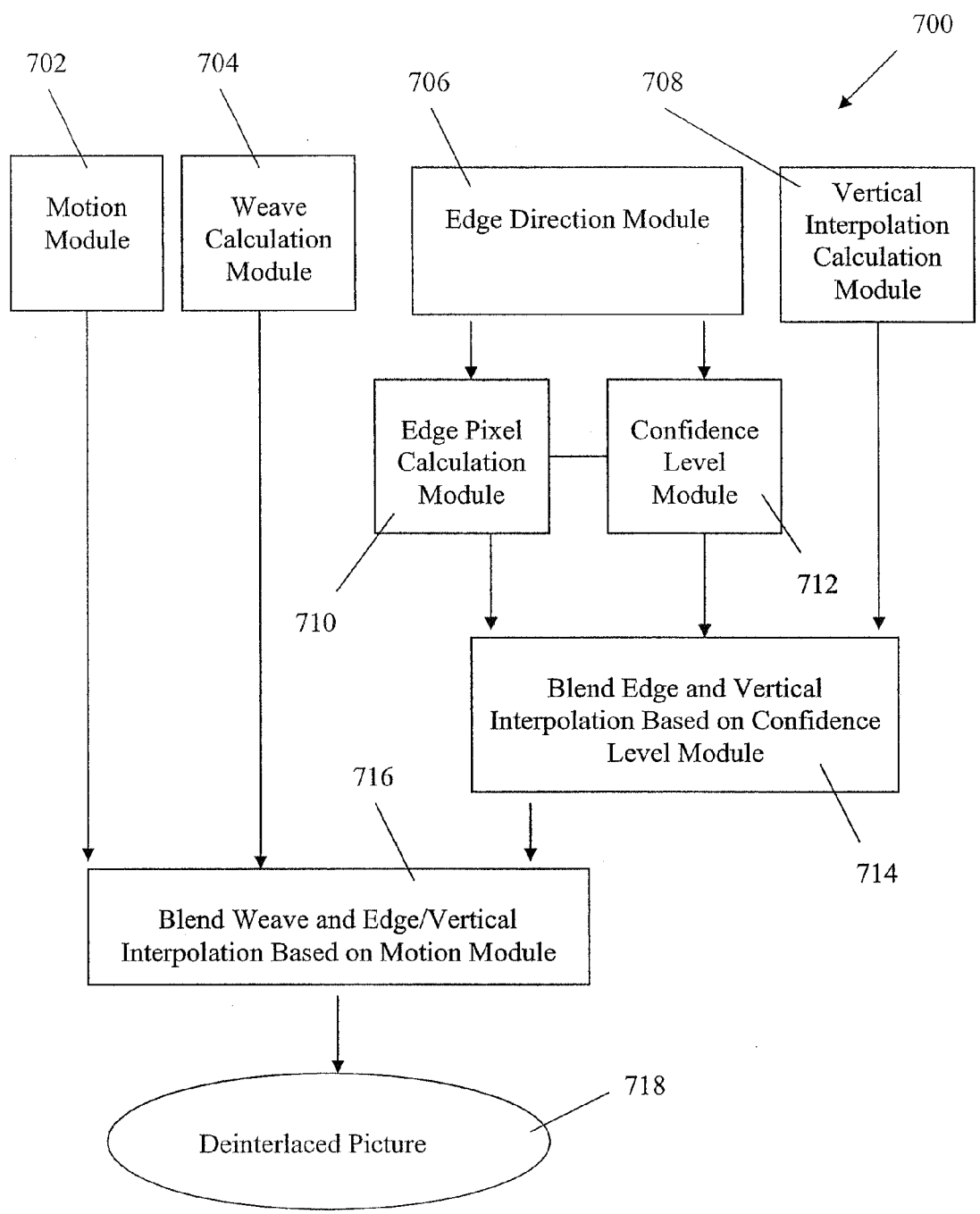
FIG. 7 depicts a system for providing a deinterlaced picture.

FIG. 7 depicts a system 700 for providing a deinterlaced picture. In the example of FIG. 7, the system 700 includes a motion module 702, a weave calculation module 704, an edge direction module 706, a vertical interpolation calculation module 708, an edge pixel calculation module 710, a confidence level module 712, a blend edge and vertical interpolation based on confidence level module 714 and a blend weave and edge/vertical interpolation based on motion module 716. The motion module 702 and the weave calculation module 704 are coupled to the blend weave and edge/vertical interpolation based on motion module 716.

The edge direction module 706 is coupled to the edge pixel calculation module 710 and the confidence level module 712. The vertical interpolation calculation module 708 is coupled to the blend edge and vertical interpolation based on confidence level module 714. The edge pixel calculation module 710 is coupled to the confidence level module 712 and the blend edge and vertical interpolation based on confidence level module 714. The confidence level module 712 is also coupled to the blend edge and vertical interpolation based on confidence level module 714. The blend edge and vertical interpolation based on confidence level module 714 is coupled to the blend weave and edge/vertical interpolation based on motion module 716.

In operation, the motion module 702 calculates a value based on the motion in an interlaced picture and provides that value to the blend weave and edge/vertical interpolation based on motion module 716. The weave calculation module 704 creates a first deinterlaced picture using a weaving technique. The first deinterlaced picture from the weave calculation module 704 is provided to the blend weave and edge/vertical interpolation module 716.

The edge direction module 706 detects an edge in an interlaced picture. The edge can be detected using a variety of techniques, including, by way of example, using gradients of image intensity. The result of the edge direction module 706 is provided to the edge pixel calculation module 710 and the confidence level module 712. The vertical interpolation calculation module 708 calculates a pixel using vertical interpolation. The result of the vertical interpolation calculation module 708 is provided to the blend edge and vertical interpolation based on confidence level module 714.

The edge pixel calculation module 710 receives the results of the edge direction module 706 and the confidence level module 712 to generate a calculation for pixels located along the detected edge. In some embodiments, the calculation can be determined by computing the angle of the detected edge and mapping the angle to predetermined bins. The calculation provides the blend edge and vertical interpolation based on confidence level module 714 along with the results of the confidence level module 712. The blend edge and vertical interpolation based on confidence level module 714 blends the results of the edge pixel calculation module 710 and the vertical interpolation calculation module 708 based on the results from the confidence level module 712. The result of the blend edge and vertical interpolation based on confidence level module 714 is a second deinterlaced picture.

The second deinterlaced picture is provided to the blend weave and edge/vertical interpolation based on motion module 716. The blend weave and edge/vertical interpolation based on motion module 716 blends the first deinterlaced picture from the weave calculation module 704 with the second deinterlaced picture from the blend edge and vertical interpolation based on confidence level module 714. The blending is based on the results of the motion module 702. The result of the blend weave and edge/vertical interpolation based on motion module 716 is a final deinterlaced picture 718.

Figure 8:
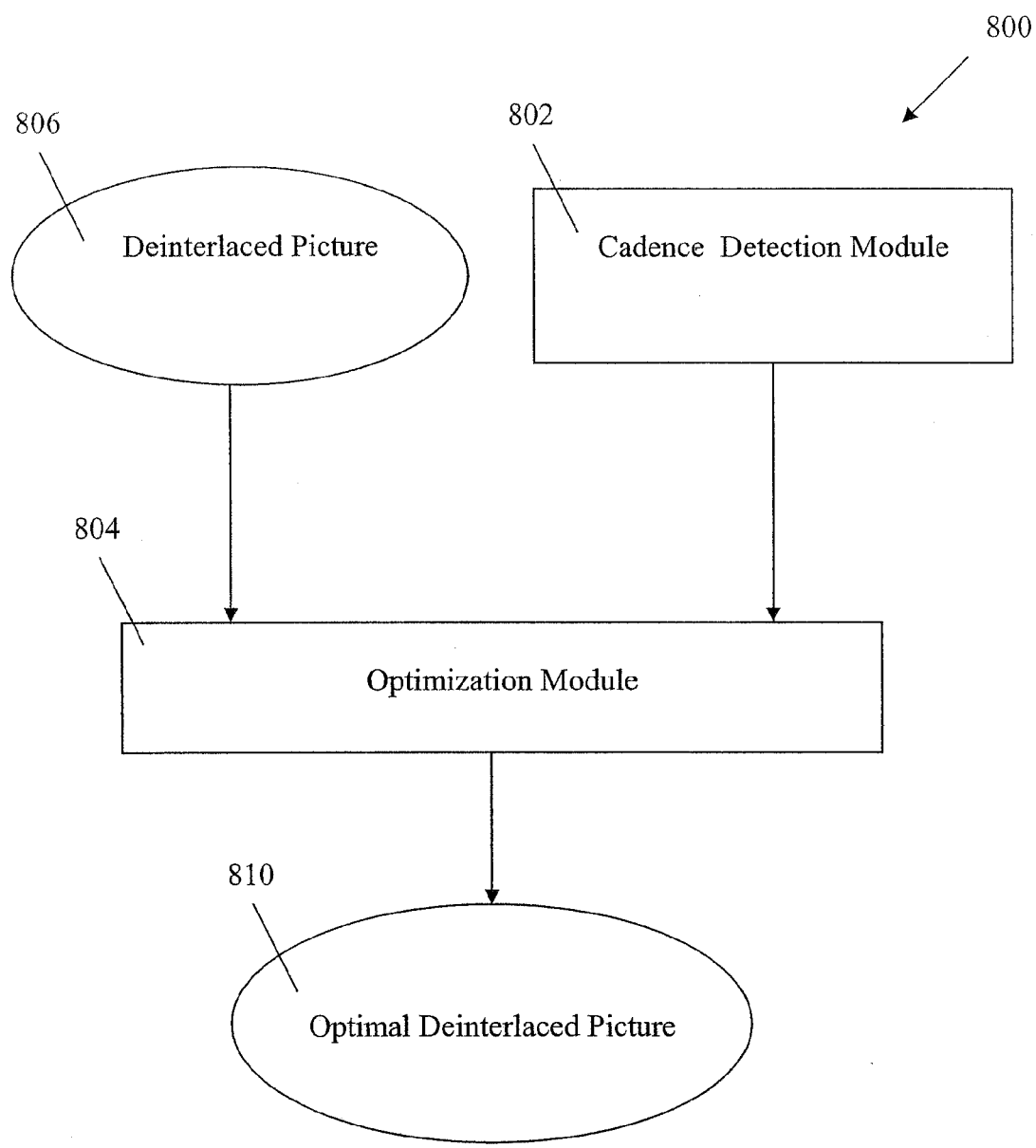
FIG. 8 depicts a system for providing an optimal deinterlaced picture.

FIG. 8 depicts a system 800 for providing an optimal deinterlaced picture 806. In the example of FIG. 8, the system includes a cadence detection module 802 and an optimization module 804. The cadence detection module 802 is coupled to the optimization module 804.

In operation, the cadence detection module 802 provides an output to the optimization module 804 if a cadence has been identified. The optimization module also receives a deinterlaced picture 806 from another source. In one embodiment, the deinterlaced picture 806 can be provided by the blend weave and edge/vertical interpolation based on motion module 716 as depicted in FIG. 7. The optimization module provides an optimal deinterlaced picture 810. If a cadence has been identified the optimal deinterlaced picture is the result of the cadence detection module 802. If a cadence has not been identified, the optimal deinterlaced picture 810 is the deinterlaced picture 806.

Figure 9:
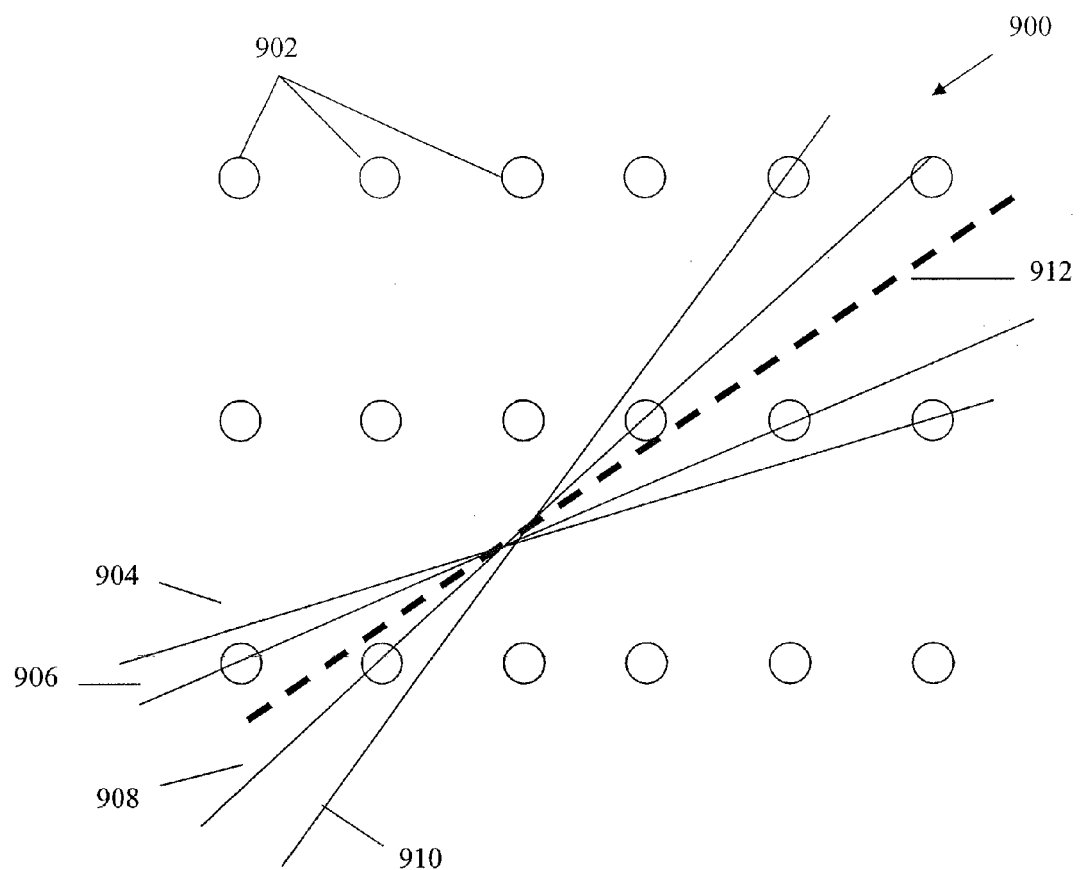
FIG. 9 depicts a video field.

FIG. 9 depicts a video field 900. In the example of FIG. 9, the video field 900 includes a plurality of known pixels 902, a plurality of bin division lines 904, 906, 908, 910 and a detected edge 912. The edge can be detected using any known and/or convenient technique including, but not limited to, being detected by an edge direction module. As shown in the example of FIG. 9, the detected edge is located between bin division lines 906, 908. As such, the upper boundary of the bin is bin line 906 and the low boundary is bin line 908. Each of the boundaries 906, 908 can constitute a possible edge direction. The edge directions can be aligned on specific pixel locations 902 in the current video field 900. The bins can be calculated using any known and/or convenient technique. In one embodiment, a bin is formed by connecting a first set of pixels with a straight line to form an upper boundary and a second set of pixels with a straight line to form a lower boundary. The area enclosed between the upper and lower boundaries forms the bin. For example, and not limitation, the bins can be formed by intersecting lines that connect every known pixel 902 with every other known pixel 902 in the video field 900 with the center location of each line being the location of the pixel to be calculated, thus creating a plurality of preset bins. In such an embodiment, the bins are pie-slice shaped wedges with a common center. In other embodiments, the intersecting lines do not have to intersect known pixels. In order to calculate unknown pixels along the detected edge 912, the pixel values along the upper boundary 908 and the lower boundary 906 can be blended. In one embodiment, the blending can be based on the distance from the detected edge to one and/or both of the bin boundaries 906, 908.

As used herein, the term "embodiment" means an embodiment that serves to illustrate by way of example but not limitation. Also, reference has been made to an image represented by pixels. However, in other embodiments, the image can be represented by any convenient and/or known discrete component that forms the basic unit of the composition of an image.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

The invention claimed is:

1. A method for producing a deinterlaced picture from an interlaced video stream, the method comprising:
    detecting an edge in the interlaced video stream,
    calculating a confidence level for the edge detection,
    calculating a pixel using the edge detection and the calculated confidence level,
    calculating a pixel using vertical interpolation,
    calculating a pixel using weaving,
    calculating a motion value for motion in the interlaced video stream,
    blending the edge pixel calculation with the vertical interpolation calculation to generate a first output pixel calculation, the blending being based on the calculated confidence level, and
    blending the first output pixel calculation with the weaving calculation to generate a second output pixel calculation, the blending being based on the motion value for motion in the interlaced video stream.

2. The method of claim 1, further comprising:
    determining whether a cadence has been identified in the interlaced video stream,
    if the cadence has been identified, outputting a result based on the cadence,
    if no cadence has been identified, outputting the second output pixel calculation.

3. The method of claim 1, wherein the calculation of the pixel using the edge detection includes computing the angle of the detected edge and mapping the angle to predetermined bins.

4. The method of claim 1, wherein calculating the confidence level based on the edge detection includes counting a number of data that is capable of a comparison that that is either similar to or different from the calculated pixel.

5. The method of claim 1, wherein blending the edge pixel calculation with the vertical interpolation calculation includes providing more weight to the vertical interpolation calculation for a first confidence level and more weight to the edge detection calculation for a second confidence level, the second confidence level being higher than the first confidence level.

6. A system for producing a deinterlaced picture from an interlaced video stream comprising:
   a motion module to determine motion in the interlaced video stream,
   a weave calculation module to a calculate a pixel using weaving,
   an edge direction module to detect an edge,
   a vertical interpolation module to calculate a pixel using vertical interpolation,
   a confidence level module coupled to the edge direction module to calculate a confidence level based on the edge detection,
   an edge pixel calculation module coupled to the edge direction module and the confidence level module to calculate a pixel based on the edge detection and the confidence level,
   a module to blend edge pixel calculation and vertical interpolation calculation coupled to the edge pixel calculation module, the vertical interpolation module and the confidence level module, and
   a module to blend weave calculation with blended edge pixel and vertical interpolation calculations coupled to the motion module, the weave calculation module, and the blend edge/vertical interpolation module;
   wherein a result of the module to blend weave calculation with blended edge pixel and vertical interpolation calculations is a deinterlaced picture.

7. The system of claim 6, further comprising:
   a cadence detection module to detect a cadence in the interlaced video stream, and
   an optimization module coupled to the cadence detection module and the module to blend weave calculation with blended edge pixel and vertical interpolation calculations;
   wherein if the cadence detection module has detected a cadence, then the cadence detection module provides a deinterlaced picture output; and
   wherein if the cadence module has not detected a module, then the module to blend weave calculation with blended edge pixel and vertical interpolation calculations provides the deinterlaced picture output.

8. The system of claim 6, wherein the calculation of the pixel using the edge detection includes computing the angle of the detected edge and mapping the angle to predetermined bins.

9. The system of claim 6, wherein calculating the confidence level based on the edge detection includes counting a number of data that is capable of a comparison that that is either similar to or different from the calculated pixel.

10. The system of claim 6, wherein blending the edge pixel calculation with the vertical interpolation calculation includes providing more weight to the vertical interpolation calculation for a first confidence level and more weight to the edge detection calculation for a second confidence level, the second confidence level being higher than the first confidence level.

* * * * *